3,326,943
FUROYLOXYALKENYL THIO PHOSPHATES
Sheldon B. Greenbaum, Tonawanda, N.Y., assignor to Hooker Chemical Corporation, Niagara Falls, N.Y., a corporation of New York
No Drawing. Filed Nov. 8, 1963, Ser. No. 322,526
3 Claims. (Cl. 260—347.2)

This invention relates to new compositions of matter and to processes for producing them. More specifically, the present invention is for novel organic phosphorothioates and phosphorodithioate esters containing in one of the ester groups both an unsaturated carbon-to-carbon linkage and a carbamate, carbonate, thiocarbonate furoate, or formate grouping, and processes for the preparation thereof.

The compounds of the invention are useful as pesticides, pesticide intermediates and as organic intermediates, as will be more fully described herein.

The novel compounds of this invention are represented by the following formula:

(I) 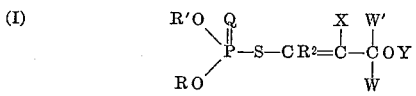

wherein

R and R' are alkyl radicals, preferably of 1 to about 6 carbon atoms;

Q is selected from the group consisting of oxygen and sulfur;

X is a halogen atom, preferably chlorine or bromine, and hydrogen;

W and W' are selected from the group consisting of hydrogen and alkyl, preferably of 1 to 6 carbon atoms;

Y is selected from the group consisting of radicals represented by the following formulas:

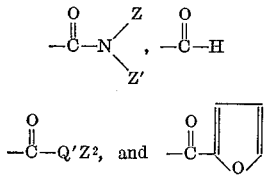

wherein

Z and Z' are selected from the group consisting of hydrogen, and alkyl radicals, preferably of 1 to 6 carbon atoms;

$Z^2$ is selected from the group consisting of alkyl, aryl, and heterocyclic radicals;

Q' is selected from the group consisting of oxygen and sulfur; and $R^2$ is selected from the group consisting of hydrogen, alkyl, preferably of 1 to 6 carbon atoms and a radical of the formula:

wherein W, W' and Y are as defined herein; said X substituent being hydrogen only when Q is sulfur.

Illustrative examples of the alkyl substituents are methyl, ethyl, propyl, butyl, hexyl, octyl, decyl, eicosyl, and the like, the alkyl group being defined as a monovalent radical derived from an aliphatic hydrocarbon by removal of one hydrogen atom, which may contain from 1 to about 20 carbon atoms, preferably containing from 1 to about 6 carbon atoms.

When the substituent $Z^2$ is alkyl, the alkyl group may be substituted by substituents such as alkoxy, i.e., methoxy, propoxy, pentoxy, etc., halogen and vinyl, or the alkyl group may be a cyclic alkyl such as cyclohexyl, cyclooctyl, and cyclopentenyl.

When $Z^2$ is an aryl substituent, it preferably contains 6 to about 14 carbon atoms and includes such radicals as phenyl, naphthyl, anthryl, and the like. The aryl group may be defined as any organic radical derived from an aromatic hydrocarbon by the removal of one hydrogen atom. The aryl radical may be substituted by substituents such as halo, alkyl, nitro, alkoxy, and like substituents.

Where $Z^2$ is a heterocyclic radical, it may be an organic radical containing a dissimilar atom or atoms, not carbon, in the ring, generally containing 1 to about 30 carbon atoms or more, preferably containing 1 to about 12 carbon atoms, such as pyranyl, tetrahydrothienyl, pyridylmethyl, furfuryl, tetrahydrofurfuryl, thienyl, furyl, and the like. In a preferred embodiment, the heterocyclic atom is selected from the group consisting of oxygen, sulfur, nitrogen, phosphorous, and the like, it being appreciated that other heterocyclic atoms such as arsenic are being embraced herein.

Illustrative examples of the compounds included within the present invention are represented by the following structures which are not intended to be limiting.

*Carbamates*

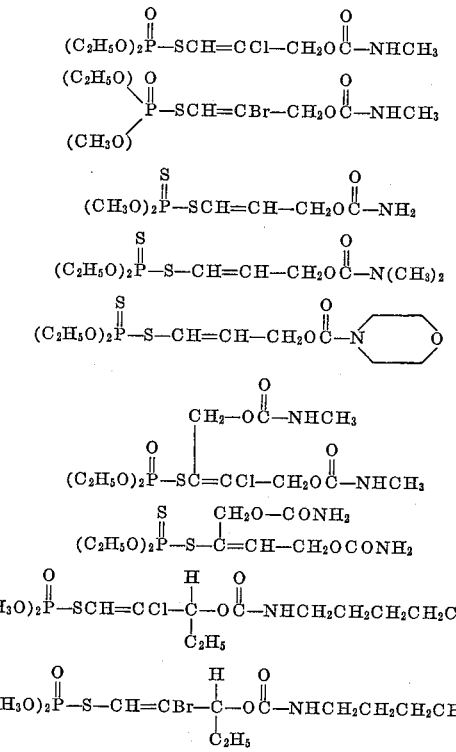

Carbonate derivatives

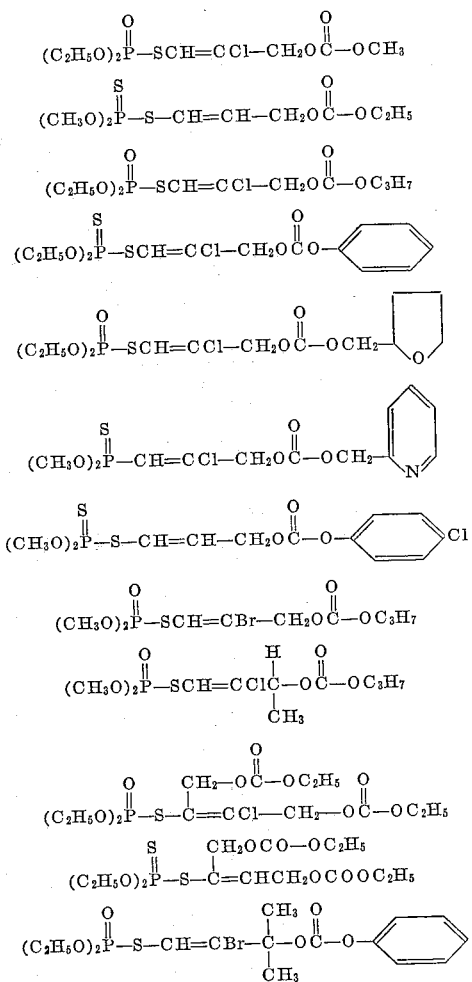

Thiocarbonate derivatives

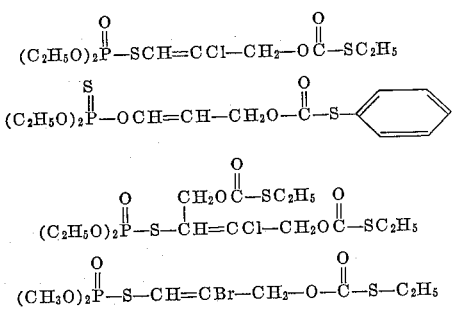

The compounds embraced within this invention thus contain a phosphorus atom linked through a sulfur atom to a vinyl carbon atom. The carbon atom on the other end of the vinyl group has one of its valences attached to an isolating carbon atom and the other valence is linked to a hydrogen atom when the phosphorus ester is a phosphorodithioate, and a halogen atom, preferably chlorine or bromine when the ester is a phosphorothioate. The isolating carbon atom can be attached to a carbamate, carbonate, thiocarbonate, furoate or formate group. The carbon atom to which the phosphorus atom is linked through sulfur may also be attached to an isolating carbon which, in turn, is attached to another carbamate, carbonate, thiocarbonate, furoate or formate group.

The novel compounds of the present invention can be prepared by several methods. A convenient method for the preparation of the novel phosphorodithioate compounds of the present invention comprises reacting a phosphorodithioic acid of the formula:

(II) 

with an alkyne of the formula:

(III) 

wherein the substituents R, R', R², W, W' and Y are as defined herein. This reaction is generally accomplished in the liquid phase at the temperature in the range from about —25 degrees centigrade to about 200 degrees centigrade, with the preferred temperature being 25 to about 60 degrees centigrade. Other temperatures can be utilized which will not adversely affect the reaction mechanism.

If desired, a solvent may be employed to facilitate the reaction. Among the suitable solvents are, e.g., benzene, toluene, ether, hexane, dioxane and the like.

The compounds of the invention where Q is oxygen and X is halogen are prepared by reacting the alkyne of Formula (III) above with a dialkoxyoxophosphorane sulfenyl halide of the formula:

wherein the substituents R, R' and X are as defined herein.

The reaction is generally accomplished with the temperature being in the range from about —40 degrees centigrade to about 60 degrees centigrade, the preferred temperature being about 25 to about 60 degrees centigrade. Other temperatures which will not adversely affect the reaction mechanism can be utilized.

If desired, an inert solvent may be employed to facilitate the reaction. Among the suitable solvents are, e.g., carbon tetrachloride, trichloroethylene, tetrachloroethane, ethyl ether, tetrahydrofuran and the like. In a like manner, irradiation, especially with ultraviolet light generally accelerates the reaction.

Generally, the reactants are reacted in molar ratios. The molar ratio of alkyne to phosphorodithioic or dialkoxyoxophosphorane sulfenyl halide is generally in the vicinity of 1:1, but an excess of the alkyne is not harmful. The alkynes of Formula (III) are readily prepared from materials which are generally commercially available. Thus propargyl alcohol, methyl butynol or 1,4-butyne-diol can be converted to their chlorocarbonates via reaction with phosgene and those, in turn, can be reacted with alcohols, amines, mercaptans, and other nucleophiles to give the desired intermediates. Alternatively, the propargyl alcohol can be treated with a substituted acid or acid chloride to give the desired intermediate.

The dialkoxyoxophorane sulfenyl halides of Formula (III) may be prepared by reacting the corresponding trialkyl thiophosphate with sulfuryl halide at low temperatures, generally below about 30 degrees centigrade and if desired in the presence of a solvent such as carbon tetrachloride, trichloroethylene, ethyl ether and like solvents.

The dialkoxyphosphorodithioic acids are readily prepared from the appropriate alcohol and $P_2S_5$ in a solvent such as toluene or benzene.

The compounds of this invention possess an unusually broad spectrum of pesticidal activity. Thus, the compositions are effective for the control of a large variety of insects such as flies, mosquitoes, roaches, beetles, silver fish, mites and the like. Many of the related compositions of the prior art are very specific in their insecticidal activity so as to require the use of other insecticides. In most instances this makes such prior art insecticides commercially unsuitable. By contrast, the compositions of this invention are especially suitable for crop and garden use where many different species of insect sare encountered. A further advantage over related compositions of the prior art is that the compounds of the invention exhibit systemic properties, that is, they can translocate from one part of a plant to another, and thus give very thorough protection against insect attack on the plant. They are also very effective against internal pests such as leaf miners.

An additional advantage of these novel compounds is that they may be utilized as petsicides in various grades of purity, ranging from a crude reaction mixture up to a highly refined product. Preferably, however, an effective amount, generally in phytotoxic concentration of the compound of the present invention is applied to the locus to be treated for best control of undesired pests. Furthermore, these compositions may be combined with other pesticides, for example, insecticides, such as DDT, methoxychlor, lindane, aldrin, endrin, benzenehexachloride, parathion, malathion, methyl parathion, lead and other metallic arsenates, rotenone, allethrin, pyrethrum, nicotine, summer oils, dormant oils, petroleum fractions and distillates, dinitroalkylphenols, dinitrocresols, chlordane, heptachlor, chlorinated terpenes, demeton, other insecticidal organophosphates, thiophosphates and dithiophosphates such as those commercially designed as Guthion, Diazinon, Dibrom and others; miticides such as bis (pentachlorocyclopentadienyl), chlorinated arylsulfonates, quinoxaline di- and trithiocarbonates, chlorinated diarylsulfones and the like, fungicides, such as sulfur, dithiocarbamates and N-trichloromethylthio-4-cyclohexene-1,2-dicarboximide, to list but a few.

It is also desirable to combine the insecticidal products of this invention with a class of potentiators or synergists known in the insecticidal art as "knockdown agents." These substances are materials which may or may not be insecticidal themselves, but which when combined with other insecticides will shorten the time required, or reduce the amounts of the insecticide necessary to effect total immobilization (knockdown) or death of the insect to be controlled. Among the large number of synergists which may be employed are the organic thiocyanates, methylenedioxyphenyl compounds such as piperonyl butoxide, 2 - (3,4 - methylenedioxyphenoxy)-3,6,9-trioxaundecane, among others.

Yet another advantage of the invented compositions is that they may readily be formulated as solids or liquids using solid or liquid solvents, vehicles, carriers or extenders. Suitable diluents are solids or liquids usually of an inert nature. Illustrative solid diluents include, among many others, sawdust, clay, flours, silicas, alkaline earth carbonates, oxides and phosphates, sulfur and the like. Suitable solvents for liquid formulations include ketones, alcohols, aromatic hydrocarbons, aliphatic hydrocarbons, and petroleum fraction or distillates. Solutions in solvents such as these may be further dispersed in water by use of emulsifiers.

Whether dissolved or dispersed, suspended or emulsified in a liquid or formulated as a dust or powder or some other solid preparation, the insecticides of this invention may advantageously contain one or more substances known or referred to variously as modifiers, wetting agents, surface active agents, dispersing agents, suspending agents, emulsifying agents or conditioning agents, said materials being referred to herein generically as adjuvants. Thus, any substance which facilitates formulation, handling and application of the insecticide of this invention may be profitably incorporated in the insecticidal composition. Frequently, such adjuvants enhance or potentiate insecticidal effectiveness. A satisfactory but not exhaustive list of these substances appears among other places in "Soap and Chemical Specialties," vol. 31, No. 7, pages 50–61; No. 8, pages 48–61; No. 9, pages 52–67 and No. 10, pages 38–67 (1955). Another source of this information is Bulletin E–607 of the Bureau of Entomology and Plant Quarantine of the United States Dept. of Agriculture.

The insecticidal compositions of this invention may be applied as a dust or a spray using among other things any of the above-mentioned exemplified formulations. The preferred method of application is a spray including petroleum fractions or distillates as diluents, plus one or more conditioning agents as formulation adjuvants. Ordinarily, a typical spray will contain between about 0.001 percent and about ten percent by weight of the invented insecticide with the remaining material being made up largely of solvent with a small amount of adjuvants.

In order that the invention may be more fully understood, the following examples are given by way of illustrations, but the invention is not limited thereto.

In the specification, examples, and claims, parts are by weight and temperatures are in degrees centigrade unless otherwise indicated.

*Example 1.—Preparation of dialkoxyoxophosphorane sulfenyl chlorides*

To a solution of 0.1 mole of trialkyl thiophosphate dissolved in 50 milliliters of carbon tetrachloride was added dropwise a mixture of 13.5 grams of sulfuryl chloride dissolved in 40 milliliters of carbon tetrachloride. The temperature was held below 30 degrees centigrade during the reaction. After 16 hours of agitation, the solution is ready for use.

*Example 2*

O,O - diethyl (3-methylcarbamyloxy-2-chloropropenyl) phosphorothiolate was prepared by treating a solution of 11.3 grams of propargyl N-methyl carbamate in 96 milliliters of carbon tetrachloride with 0.1 mole of diethoxyphosphorane sulfenyl chloride in a solution prepared as in Example 1. The mixture was stirred for 20 hours in the presence of ultraviolet light at a temperature of 76 degrees centigrade. The lower phase is stripped of solvent under vacuum to leave a residue of 29 grams of the desired product, a pale mahogany colored oil which analyzes at 9.8 percent phosphorus. The calculated percentage of phosphorus in $C_{11}H_{21}ClNO_5PS$ is 9.8.

By reacting the diethoxyoxophosphorane sulfenyl chloride, prepared as in Example 1, with 1,1-dimethyl propargyl N-methylcarbamate, O,O-diethyl (3-[methyl carbamyloxy]-2-chloro-3,3-dimethyl propenyl) phosphorothiolate as represented by the formula:

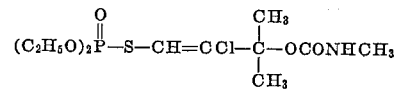

is prepared.

Similarly, the reaction of diethoxyoxophosphorane sulfenyl chloride with 1-(methylcarbamyloxy)-2-butyne results in the compound represented by the formula:

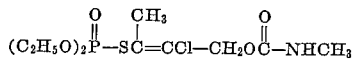

In a similar manner, the corresponding bromine compounds are prepared, such as O,O-diethyl (3-dimethylcarbamyloxy-2-bromo-3,3-dimethylpropenyl) phosphorothiolate by utilizing dialkoxyoxophosphorane sulfenyl bromide in the place of dialkoxyoxophosphorane sulfenyl chloride.

*Example 3*

O,O-diethyl (3-[ethylmercapto carbonyloxy]-2-chloropropenyl) phosphorothiolate is prepared by treating a solution of 14.4 grams of O-propargyl S-ethyl thiolcarbonate (prepared from ethyl mercaptan, propargyl alcohol, and triethylamine) in 85 milliliters of carbon tetrachloride dropwise with a solution containing 0.1 mole of diethoxyoxophosphorane sulfenyl chloride (prepared as in Example 1). After 10 hours of treatment at 40° C. with ultraviolet light, the solution is stripped of solvent, extracted with 100 milliliters of hexane and the hexane insoluble oil is again brought to complete dryness under reduced pressure. This gives 23.9 grams of the compound analyzed as 8.6 percent phosphorus compared to 8.9 percent phosphorus theoretical for $C_{10}H_{18}ClO_5PS_2$.

Reacting the diethoxyoxophosphorane sulfenyl chloride with S-ethyl O-(1,1-dimethylpropargyl) thiocarbonate under the same conditions results in the preparation of the compound as represented by the formula:

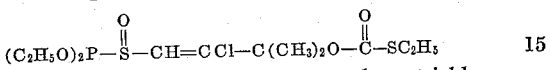

In a similar manner, other solvents such as trichloroethylene, tetrachloroethane, and ethyl ethers are employed in place of carbon tetrachloride.

The corresponding bromine compounds are prepared by utilizing diethoxyoxophosphorane sulfenyl bromide in place of diethoxyoxophosphorane sulfenyl chloride.

Likewise, the reaction of sulfenyl chloride with 1,4-bis (ethylmercaptocarbonyloxy) butyne-2 (prepared from the bis chloroformate) results in the preparation of a compound of the formula:

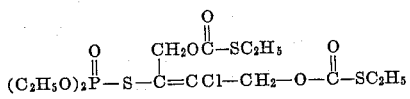

Example 4

O,O - diethyl (3-ethoxycarbonyloxy-2-chloro-propenyl) phosphorothiolate) is prepared from a solution of 12.8 grams of ethyl propargyl carbonate (prepared from ethyl chloroformate and propargyl alcohol) in 95 milliliters of carbon tetrachloride by treatment with 0.1 mole of diethoxyoxophosphorane sulfenyl chloride. After 10 hours of irradiation with ultraviolet light, at a temperature of 78 degrees centrigrade, the solution is stripped of solvent and washed with 100 milliliters of hexane. The hexane insoluble was dried resulting in the recovery of 33.6 grams of the desired compound, a straw colored oil analyzing as 9.3 percent phosphorus. The theoretical calculated for $C_{10}H_{18}ClO_6PS$ is 9.4 percent.

The corresponding -2-bromo compound is prepared by utilizing diethoxyoxophosphorane sulfenyl bromide in place of diethoxyoxophosphorane sulfenyl chloride.

The analogous reaction of diethoxyphosphorane sulfenyl chloride with bis (ethoxycarbonyloxy) butyne-2 (prepared from the bis chloroformate) results in the preparation of a compound as represented by the formula:

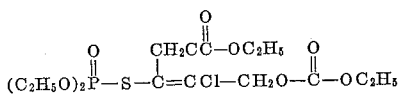

Example 5

O,O-diethyl (2-chloro-3-[phenylmercaptocarbonyloxy] propenyl) phosphorothiolate is prepared from a solution of 19.2 grams of S-phenyl-O-propargyl thiolcarbonate in 85 milliliters of carbon tetrachloride treated dropwise with 0.1 mole of diethoxyoxophosphorane sulfenyl chloride solution. After 10 hours of treatment with ultraviolet light at 40 degrees centigrade, the solution was stripped of solvent under reduced pressure, extracted with 100 milliliters of hexane and the hexane insoluble oil reduced to dryness in vacuo to afford 28.6 grams of product, a pale yellow oil analyzing as 16.7 percent phosphorus. The theoretical calculated for $C_{14}H_{18}ClO_5PS_2$ is 16.2 percent.

Example 6

The following compounds as shown in Table I were tested for systemic activity on aphids and leaf miners.

In these systemic tests, infested bean plants were treated with an aqueous suspension at a rate of 64 pounds per acre, which corresponds to actual row treatment of one pound per acre. The insect mortality is noted after 24 hours, with results as follows:

TABLE I

| Compound | Systemic Activity Test, Black Bean Aphids, Percent Killed | Leaf Miner Control at 125 p.p.m. |
|---|---|---|
| $(CH_3O)_2\overset{S}{\overset{\|}{P}}-S-CH=CH-CH_2O\overset{O}{\overset{\|}{C}}-NHCH_3$ | 100 | + |
| $(C_2H_5O)_2\overset{S}{\overset{\|}{P}}-S-CH=CH-CH_2O\overset{O}{\overset{\|}{C}}-NHCH_3$ | 100 | |
| $(CH_3O)_2\overset{O}{\overset{\|}{P}}-SCH=CCl-CH_2O\overset{O}{\overset{\|}{C}}-NHCH_3$ | 100 | + |
| $(C_2H_5O)_2\overset{S}{\overset{\|}{P}}-SCH=CH-CH_2OCH$ | 0 | + |
| $(CH_3O)_2\overset{O}{\overset{\|}{P}}-SCH=CH-CH_2O\overset{O}{\overset{\|}{C}}-N(CH_3)_2$ | 100 | + |
| $(C_2H_5O)_2\overset{S}{\overset{\|}{P}}-SCH=CH-CH_2O\overset{O}{\overset{\|}{C}}-N(CH_3)_2$ | 100 | + |
| $(CH_3O)_2\overset{O}{\overset{\|}{P}}-SCH=CCl-CH_2O-\overset{O}{\overset{\|}{C}}\underset{O}{\diagdown}$ | 100 | + |
| $(CH_3O)_2\overset{S}{\overset{\|}{P}}-SCH=CH-CH_2O-\overset{O}{\overset{\|}{C}}-\langle\rangle$* | 0 | 0 |
| $(CH_3O)_2\overset{O}{\overset{\|}{P}}-SCH=CCl-CH_2O\overset{O}{\overset{\|}{C}}-\langle\rangle$* | 0 | 0 |

*For purposes of comparison.
+=Effective Control; 0=No Control.

Example 7

The following compounds, as shown in Table II below, were tested for housefly mortality by spraying aqueous dispersions of the compound at the concentrations shown, onto adult houseflies (*Musca domestica*)

pounds were tested for their activity against various forms of insect life by spraying insect infested plants with aqueous suspensions at the concentrations shown.

TABLE II

| Compound | Percent Killed | | |
|---|---|---|---|
| | 125 p.p.m. | 62 p.p.m. | 31 p.p.m. |
| $(CH_3O)_2\overset{S}{\underset{\parallel}{P}}-S-CH=CH-CH_2O\overset{O}{\underset{\parallel}{C}}-NHCH_3$ | 100 | 100 | 20 |
| $(C_2H_5O)_2\overset{S}{\underset{\parallel}{P}}-S-CH=CH-CH_2O\overset{O}{\underset{\parallel}{C}}-NHCH_3$ | 100 | 100 | 90 |
| $(C_2H_5O)_2\overset{S}{\underset{\parallel}{P}}-S-CH=CH-CH_2OCHO$ | 100 | 100 | 100 |
| $(CH_3O)_2\overset{S}{\underset{\parallel}{P}}-S-CH=CH-CH_2O\overset{O}{\underset{\parallel}{C}}-CH_3$* | 0 | 0 | 0 |
| $(CH_3O)_2\overset{O}{\underset{\parallel}{P}}-SCH=CCl-CH_2O\overset{O}{\underset{\parallel}{C}}-CH_3$* | 0 | 0 | 0 |
| $(C_2H_5O)_2\overset{S}{\underset{\parallel}{P}}-S-CH=CH-CH_2O\overset{O}{\underset{\parallel}{C}}-OC_2H_5$ | 100 | 100 | 10 |
| $(C_2C_5O)_2\overset{S}{\underset{\parallel}{P}}-S-CH=CH-CH_2O\overset{O}{\underset{\parallel}{C}}-OCH(CH_3)_2$ | 100 | 100 | 100 |
| $(CH_3O)_2\overset{O}{\underset{\parallel}{P}}-S-CH=CCl-CH_2O\overset{O}{\underset{\parallel}{C}}-OC(CH_3)_2$ | 100 | 100 | 03 |
| $(C_2H_5O)_2\overset{O}{\underset{\parallel}{P}}-SCH=CCl-CH_2O\overset{O}{\underset{\parallel}{C}}-O(CH_2)_2OCH_3$ | 100 | 100 | 100 |

The mortality was observed after 24 hours.

The mortality is observed after 24 hours, with results as follows:

| Compound | Southern Army Worm, 1%, Percent Killed | Mexican Bean Beetle 125 p.p.m., Percent Killed | Black Bean Aphids 125 p.p.m., Percent Killed |
|---|---|---|---|
| $(C_2H_5O)_2\overset{S}{\underset{\parallel}{P}}-SCH=CH-CH_2O\overset{O}{\underset{\parallel}{C}}-NHCH_3$ | 100 | 100 | 100 |
| $(CH_3O)_2\overset{S}{\underset{\parallel}{P}}-SCH=CH-CH_2O\overset{O}{\underset{\parallel}{C}}-CH_3$* | 0 | 0 | 17 |

*For comparison.

The corresponding bromine compounds were similarly tested and possess similar activity.

Example 8

In a similar manner to Example 7, the following com-

Example 9

In a similar manner to Example 8, the following compounds were sprayed in aqueous dispersions at the concentration as shown in parts per million, on mite infested bean plants.

| Compound | Percent Killed | | |
|---|---|---|---|
| | 500 p.p.m. | 250 p.p.m. | 125 p.p.m. |
| $(C_2H_5O)_2\overset{O}{\underset{\|}{P}}-S-CH=CH-CH_2O\overset{O}{\underset{\|}{C}}-SC_2H_5$ | 44 | 40 | 26 |
| $(C_2H_5O)_2\overset{S}{\underset{\|}{P}}-S-CH=CCl-CH_2O\overset{O}{\underset{\|}{C}}-SC_2H_5$ | 100 | 100 | 100 |
| $(C_2H_5O)_2\overset{O}{\underset{\|}{P}}-S-CH=CH-CH_2O\overset{O}{\underset{\|}{C}}-S-\phantom{xx}\bigcirc$ | 49 | 43 | 0 |
| $(C_2H_5O)_2\overset{S}{\underset{\|}{P}}-S-CH=CCl-CH_2O\overset{O}{\underset{\|}{C}}-S\phi$ | 100 | 100 | 100 |
| $(C_2H_5O)_2\overset{S}{\underset{\|}{P}}-S-CH=CH-CH_2O\overset{O}{\underset{\|}{C}}-\text{(furyl)}$ | 100 | 100 | 2 |
| $(C_2H_5O)_2\overset{O}{\underset{\|}{P}}-S-CH=CCl-CH_2O\overset{O}{\underset{\|}{C}}-\text{(furyl)}$ | 100 | 100 | 100 |

Example 10

O,O-diethyl (2-chloro-3-[tetrahydrofurfuryloxycarbonyloxy]propenyl) phosphorothiolate is prepared from a solution of 184 grams of tetrahydrofurfuryl propargyl carbonate in 86 milliliters of carbon tetrachloride by dropwise treatment with 0.1 mole of diethoxyphosphorane sulfenyl chloride. After 10 hours of exposure to ultraviolet light (during which time the temperature rises to 45 degrees), the solution is reduced to dryness and the residue washed with 100 milliliters of hexane. The hexane insoluble is reduced to dryness to give 25 grams of product, a straw colored oil, analyzing as 8.0 percent phosphorus. The theoretical calculated for $C_{13}H_{22}ClO_7PS$ is 8.3.

Example 11.—O,O-dialkyl phosphorodithioates (dialkyl phosphorodithioic acid)

A mixture of 183 grams (0.41 mole) of phosphorus pentasulfide ($P_4S_{10}$) and 300 milliliters of toluene is stirred and brought to 80 degrees centigrade. The appropriate anhydrous alcohol (0.36 mole) is then added over a 2 hour period. The mixture is then brought to full reflux for 2 more hours, cooled and filtered. If the alcohol used has a boiling point lower than that of the toluene, it may be removed by topping with an 18″ Vigreaux column. The average titer is 2.62 milliequivalents of acid per milliliter of solution.

Example 12

O,O-diethyl (3-dimethyl carbamyloxypropenyl) phosphorodithioate is prepared by refluxing a solution of 12.7 grams (0.1 mole) of propargyl N,N-dimethylcarbamate and 0.1 mole of O,O-diethylphosphorodithioic acid (prepared as above) in a total of 140 milliliters of toluene for 18 hours. Titration of the residual acidity indicates 98 percent reaction. The residue is dried and a vacuum applied to effect 28.5 grams of the compound, a pale oil. It analyzes as 10.4 percent phosphorus compared with 9.4 percent phosphorus theoretical.

By reacting the diethyl phosphorodithioic acid with 1,1-dimethylpropargyl N,N-dimethylcarbamate,

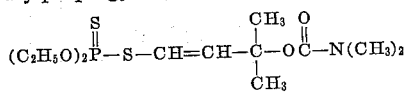

is prepared.

In a similar manner, reaction of diethyl phosphorodithioic acid with 1,4-bis (dimethylcarbamyloxy) butyne-2 results in the compound represented by the formula:

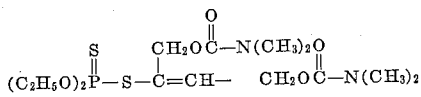

Example 13

O,O-diethyl 3-(isopropoxycarbonyloxy) propenyl phosphorodithioate is prepared as in Example 12 using 14.2 grams (0.1 mole) of isopropyl propargyl carbonate, 0.1 mole of O,O-diethyl phosphorothioate, and 75 ml. of toluene. The product, a pale oil, weighs 32 grams and analyzes as 10.5 percent phosphorus and 20.2 percent sulfur compared with 10.5 percent phosphorus and 19.5 percent sulfur theoretical.

By reacting the diethyl phosphorodithioic acid with (1,1-dimethyl propargyl) isopropyl carbonate the compound having the formula:

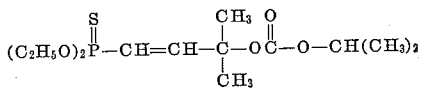

is prepared.

In a similar manner, the reaction of diethyl phosphorodithioic acid with 1,4-bis (isopropoxycarbonyloxy) butyne-2 results in the compound represented by the formula:

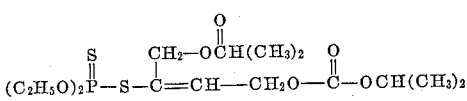

Example 14

O,O - diethyl 3 - (ethylmercaptocarbonyloxy) propenyl phosphorodithioate is prepared as in Example 12 using 14.4 grams (0.1 mole) of S-ethyl O-propargyl thiolcarbonate, O,O-diethyl phosphorodithioate (0.1 mole) and 75 milliliters of toluene. Titration of the residual acid indicates 97 percent reaction. The product is a yellow oil analyzing as 9.3 percent phosphorus compared to 9.11 percent theoretical.

| Ex. No. | Phosphorus Containing Reactant | Acetylenic Reactant | Product | Properties | Analysis (in percent) | |
|---|---|---|---|---|---|---|
| | | | | | P Calculated | P Found |
| 15 | $(CH_3O)_2POSCl$ | $CH{\equiv}CCH_2OCONHCH_3$ | $(CH_3O)_2POSCH{=}CClCH_2O\overset{O}{\overset{\|}{C}}NHCH_3$ | Oil | 10.7 | 10.9 |
| 16 | $(CH_3O)_2POSCl$ | $CH{\equiv}CCH_2OCON(CH_3)_2$ | $(CH_3O)_2POSCH{=}CCl{-}CH_2OCON(CH_3)_2$ | Oil | 10.3 | 10.0 |
| 17 | $(C_2H_5O)_2POSCl$ | $CH{\equiv}CCH_2OCOCH_2CH_2OCH_3$ | $(C_2H_5O)_2POSCH{=}CClCH_2O\overset{O}{\overset{\|}{C}}OCH_2CH_2OCH_3$ | Oil | 8.6 | 8.8 |
| 18 | $(CH_3O)_2POSCl$ |  |  | Oil | 8.6 | 8.0 |
| 19 | $(CH_3O)_2POSCl$ | $CH{\equiv}CCH_2OCOOCH_2CH_2OCH_3$ | $(CH_3O)_2POSCH{=}CClCH_2OCOOCH_2CH_2OCH_3$ | Oil | 9.3 | 9.8 |
| 20 | $(CH_3O)_2POSCl$ | $CH{\equiv}CCH_2OCOSC_6H_5$ | $(CH_3O)_2POSCH{=}CClCH_2OCOSC_6H_5$ | Oil | 8.5 | 8.5 |
| 21 | $(C_2H_5O)_2POSCl$ | $CH{\equiv}CCH_2OCHO$ | $(C_2H_5O)_2POSCH{=}CClCH_2OCHO$ | Oil | 11.1 | 11.5 |
| 22 | $(CH_3O)_2PSSH$ | $CH{\equiv}C{-}CH_2O\overset{O}{\overset{\|}{C}}{-}N(CH_3)_2$ | $(CH_3O)_2PSSCH{=}CH{-}CH_2O\overset{O}{\overset{\|}{C}}N(CH_3)_2$ | Oil | 10.9 | 10.9 |
| 23 | $(C_2H_5O)_2PSSH$ | $CH{\equiv}C{-}CH_2O\overset{O}{\overset{\|}{C}}{-}NHCH_3$ | $(C_2H_5O)_2PSSCH{=}CH{-}CH_2{-}O\overset{O}{\overset{\|}{C}}NHCH_3$ | Oil | 10.11 | 11.4 |
| 24 | $(C_2H_5O)_2PSSH$ | $CH{\equiv}C{-}CH_2OCHO$ | $(C_2H_5O)_2PSSCH{=}CH{-}CH_2OCHO$ | Oil | 11.3 | 11.4 |
| 25 | $(CH_3O)_2PSSH$ |  |  | Oil | 8.8 | 8.1 |
| 26 | $(CH_3O)_2PSSH$ |  |  | Oil | 8.5 | 8.4 |

The data presented in Example 6 illustrate both the systemic activity and the leaf miner control of the compounds of this invention. The data is compared with related compounds of the prior art and clearly demonstrates the superiority of the compounds of the invention.

Another illustration of the advantage of these compounds in terms of potency is shown in Example 7 where the ability to eradicate houseflies is shown to be far greater for the compounds of the invention as compared to compounds of the related art.

The very broad spectrum of activity of the compounds of the present instance is illustrated in Example 8 which indicates insect toxicity which is in addition to that found in Examples 6 and 7.

The acaricidal activity of compounds of the invention are demonstrated in Example 9.

The data presented in the aforementioned group of examples readily indicate the preferred embodiments of the invention. Thus, where a broad spectrum of insect species control is desired, the preferred embodiment is found in the group, where X is hydrogen and Y is a carbamate structure. These structures are also especially advantageous where systemic activity and action on internal pests such as leaf miners is concerned.

Where intensive acaridical activty is desired, the preferred embodiment lies in the group of compounds where X is chloride and Y is thiolcarbonate as demonstrated in Example 9.

Where extensive housefly activity is desired, carbonate esters are a preferred group.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A compound represented by the formula:

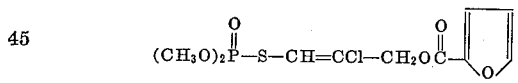

2. A compound as represented by the formula:

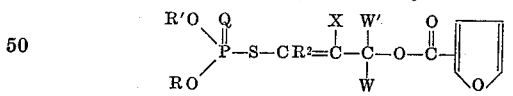

wherein

R and R' are alkyl of from 1 to about 6 carbon atoms;

Q is selected from the group consisting of oxygen and sulfur;

X is selected from the group consisting of chlorine, bromine and hydrogen;

W and W' are selected from the group consisting of hydrogen and alkyl of 1 to about 6 carbon atoms;

$R^2$ is selected from the group consisting of hydrogen, alkyl of from 1 to 6 carbon atoms and

wherein W and W' are as defined above, said X substituent being hydrogen only when Q is sulfur.

3. A compound of the formula:

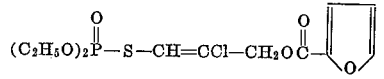

(References on following page)

References Cited

UNITED STATES PATENTS

| | | | |
|---|---|---|---|
| 3,059,014 | 10/1962 | Miller et al. | 260—461.112 |
| 3,092,649 | 6/1963 | Schrader | 260—461 |
| 3,096,236 | 7/1963 | D'Amico | 167—22 |
| 3,101,364 | 8/1963 | Ward et al. | 260—461 |
| 3,102,020 | 8/1963 | Speziale et al. | 71—2.7 |
| 3,112,244 | 11/1963 | Goyette | 167—22 |

ALEX MAZEL, *Primary Examiner.*

HENRY R. JILES, N. S. RIZZO, *Examiners.*

J. D. RANDOLPH, *Assistant Examiner.*